United States Patent
Dussault

(10) Patent No.: US 11,866,181 B2
(45) Date of Patent: Jan. 9, 2024

(54) AIRCRAFT POWER PLANT

(71) Applicant: PRATT & WHITNEY CANADA CORP., Longueuil (CA)

(72) Inventor: Serge Dussault, Ste-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 30 days.

(21) Appl. No.: 17/475,848

(22) Filed: Sep. 15, 2021

(65) Prior Publication Data
US 2023/0085551 A1   Mar. 16, 2023

(51) Int. Cl.
| | |
|---|---|
| B64D 27/04 | (2006.01) |
| F02B 53/10 | (2006.01) |
| F02B 53/14 | (2006.01) |
| F02B 3/10 | (2006.01) |
| F02B 37/00 | (2006.01) |
| F01P 3/00 | (2006.01) |
| F02B 53/00 | (2006.01) |

(52) U.S. Cl.
CPC ............ B64D 27/04 (2013.01); F02B 3/10 (2013.01); F02B 37/001 (2013.01); F02B 53/10 (2013.01); F02B 53/14 (2013.01); F01P 2003/001 (2013.01); F01P 2050/20 (2013.01); F02B 2053/005 (2013.01)

(58) Field of Classification Search
CPC .......... B64D 27/04; F02B 3/10; F02B 37/001; F02B 53/10; F02B 53/14; F02B 2053/005; F01P 2003/001; F01P 2050/20
USPC ................................ 60/247, 598, 607; 123/2
See application file for complete search history.

(56) References Cited

U.S. PATENT DOCUMENTS

| | | | | |
|---|---|---|---|---|
| 3,007,302 A | * | 11/1961 | Vincent | F02B 41/10 60/624 |
| 7,621,116 B2 | | 11/2009 | Rom et al. | |
| 7,775,044 B2 | * | 8/2010 | Julien | F02C 3/055 60/624 |
| 8,109,074 B2 | | 2/2012 | Rom | |
| 8,141,360 B1 | * | 3/2012 | Huber | F01K 23/065 290/40 B |
| 10,107,195 B2 | | 10/2018 | Bolduc et al. | |

(Continued)

FOREIGN PATENT DOCUMENTS

GB          1518098          7/1978

OTHER PUBLICATIONS

European Patent Office, Communication re. extended European search report for European patent application No. 22195731.9, dated Feb. 6, 2023.

*Primary Examiner* — J. Todd Newton
(74) *Attorney, Agent, or Firm* — Norton Rose Fulbright Canada LLP

(57) ABSTRACT

Aircraft power plants and associated methods are provided. A method for driving a load on an aircraft includes: transferring motive power from an internal combustion (IC) engine to the load; discharging a flow of first exhaust gas from the IC engine when transferring motive power from the IC engine to the load; receiving the flow of first exhaust gas from the IC engine into a combustor; mixing fuel with the first exhaust gas in the combustor and igniting the fuel to generate a flow of second exhaust gas; receiving the flow of second exhaust gas at a turbine and driving the turbine with the flow of second exhaust gas from the combustor; and transferring motive power from the turbine to the load.

12 Claims, 5 Drawing Sheets

(56) References Cited

U.S. PATENT DOCUMENTS

| | | |
|---|---|---|
| 10,145,291 B1 | 12/2018 | Thomassin et al. |
| 2015/0275749 A1 | 10/2015 | Thomassin |
| 2016/0319742 A1 | 11/2016 | Primus et al. |
| 2016/0376981 A1* | 12/2016 | Ullyott .................... F02B 63/04 60/607 |
| 2020/0386408 A1 | 12/2020 | Menheere et al. |

* cited by examiner

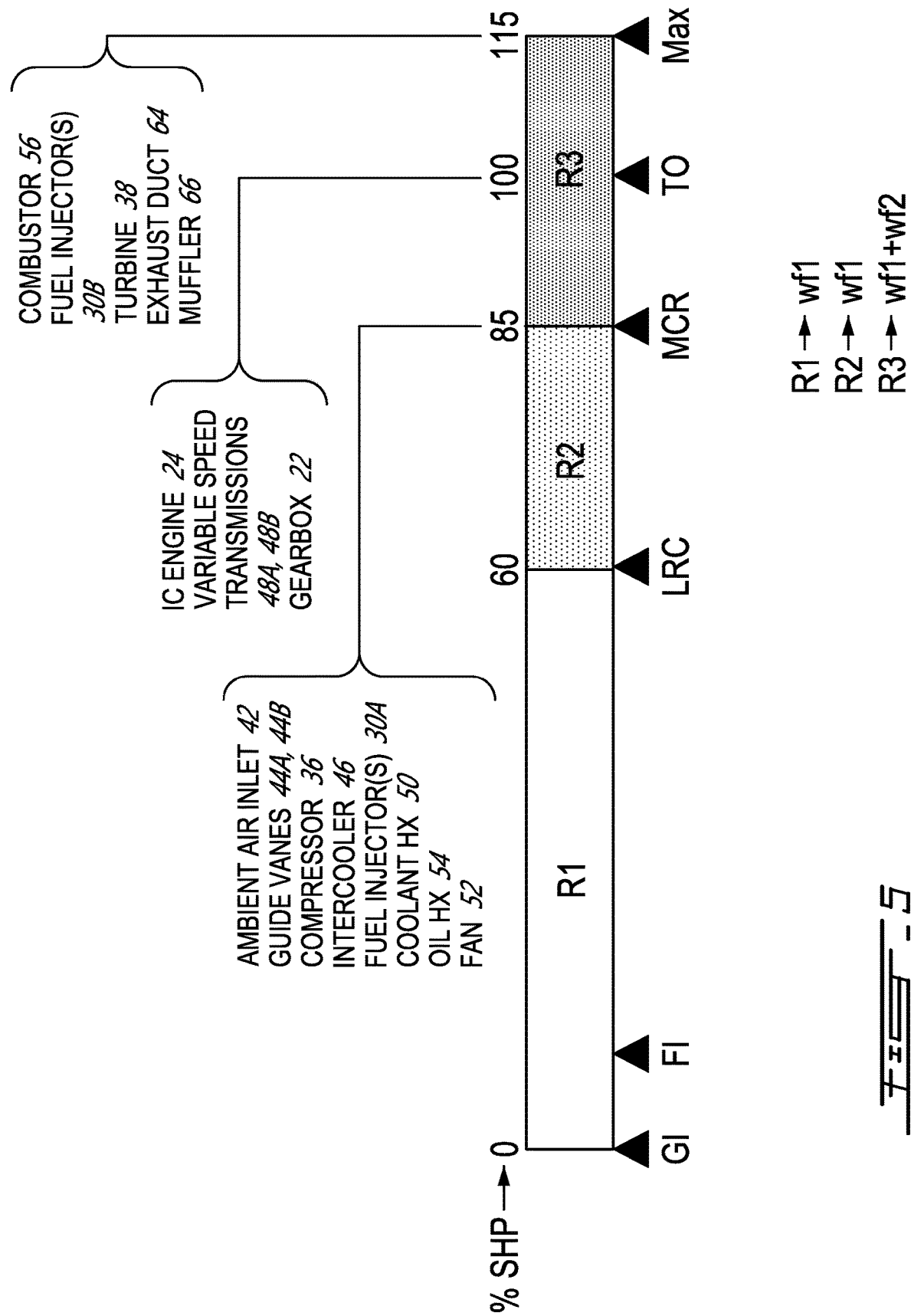

AIRCRAFT POWER PLANT

TECHNICAL FIELD

The disclosure relates generally to aircraft, and more particularly to aircraft power plants.

BACKGROUND

It is desirable for aircraft engines to operate in an energy efficient manner to promote reduced fuel consumption and operating costs. In aircraft applications, the power output capacity of an engine relative to the weight of the engine is an important factor that can affect the overall efficiency of the aircraft since the weight of the engine must be carried by the aircraft during flight. Aircraft engines can be required to have a maximum power output rating that can be produced during short-term (i.e., momentary) peak power operation in situations such as during take-off or during emergency situations. Even though, the long-term continuous operation of the aircraft engines during a cruise phase of flight, for example, can be well below such maximum power output rating, the maximum power output rating can necessitate increased size and weight of aircraft engines. Improvement is desirable.

SUMMARY

In one aspect, the disclosure describes an aircraft power plant comprising:
  an internal combustion (IC) engine using intermittent combustion during operation, the IC engine being drivingly connected to a load to transfer motive power from the IC engine to the load, the IC engine having an exhaust outlet for discharging a flow of first exhaust gas;
  a combustor including: a combustor inlet in fluid communication with the exhaust outlet of the IC engine to receive the flow of first exhaust gas from the IC engine into the combustor; a fuel injector for injecting fuel into the combustor in which the fuel is mixed with the first exhaust gas and ignited to generate a flow of second exhaust gas; and a combustor outlet for discharging the flow of second exhaust gas; and
  a turbocharger associated with the IC engine, the turbocharger including: a turbine in fluid communication with the combustor outlet and driven by the flow of second exhaust gas, the turbine being drivingly connected to the load to transfer motive power from the turbine to the load; and a compressor drivingly connected to the turbine and driven by the turbine to compress combustion air for the IC engine.

In another aspect, the disclosure describes an aircraft engine system comprising:
  a Wankel engine drivingly connected to a load to transfer motive power from the Wankel engine to the load, the Wankel engine having an exhaust outlet for discharging a flow of exhaust gas from the Wankel engine;
  a turbine in fluid communication with the exhaust outlet of the Wankel engine and driven by the flow of exhaust gas, the turbine being drivingly connected to the load to transfer motive power from the turbine to the load; and
  an inter-burner operatively disposed between the Wankel engine and the turbine to add energy to the flow of exhaust gas between the Wankel engine and the turbine.

In a further aspect, the disclosure describes a method of driving a load onboard an aircraft. The method comprises:

transferring motive power from an internal combustion (IC) engine to the load, the IC engine using intermittent combustion during operation;
  discharging a flow of first exhaust gas from the IC engine when transferring motive power from the IC engine to the load;
  receiving the flow of first exhaust gas from the IC engine into a combustor;
  mixing fuel with the first exhaust gas in the combustor and igniting the fuel to generate a flow of second exhaust gas;
  receiving the flow of second exhaust gas at a turbine and driving the turbine with the flow of second exhaust gas from the combustor; and
  transferring motive power from the turbine to the load.

Further details of these and other aspects of the subject matter of this application will be apparent from the detailed description included below and the drawings.

DESCRIPTION OF THE DRAWINGS

Reference is now made to the accompanying drawings, in which:

FIG. 5 is another graphical representation of different operating regimes of the engine system of FIG. 2 together with other exemplary sizing requirements for elements of the engine system.

DETAILED DESCRIPTION

The present disclosure describes aircraft power plants, engine systems, and associated methods. In various embodiments, aircraft power plants described herein may be configured to provide momentary supplemental power output without necessitating significant size or weight increase of the aircraft power plants. For example, the aircraft power plants described herein may include an internal combustion (IC) engine with one or more associated systems such as a liquid cooling system, an oil cooling system, and bearings that are sized according to a power output capacity of the IC engine. In some embodiments, the momentary supplemental power output capacity of the power plant may be provided via a combustor (i.e., inter-burner) in which fuel may be mixed with exhaust gas from the IC engine, and the mixture may be ignited to generate supplemental power that may be extracted via a turbine and used when needed. In some embodiments, the combustor may provide momentary supplemental power output capacity for the power plant as a whole without increasing the power output capacity of the IC engine, the size and weight the (e.g., liquid cooling) systems of the IC engine, and bearings of the IC engine. Accordingly, the IC engine and its associated systems may be sized and designed for efficient operation during long-term continuous operation of the aircraft power plant during a cruise phase of flight for example, and the supplemental power output capacity may be provided by selectively activating the combustor when needed.

Aspects of various embodiments are described through reference to the drawings.

The term "connected" may include both direct connection (where two elements contact each other) and indirect connection (where at least one additional element is located between the two elements).

The term "substantially" as used herein may be applied to modify any quantitative representation which could permissibly vary without resulting in a change in the basic function to which it is related.

Figure 1:
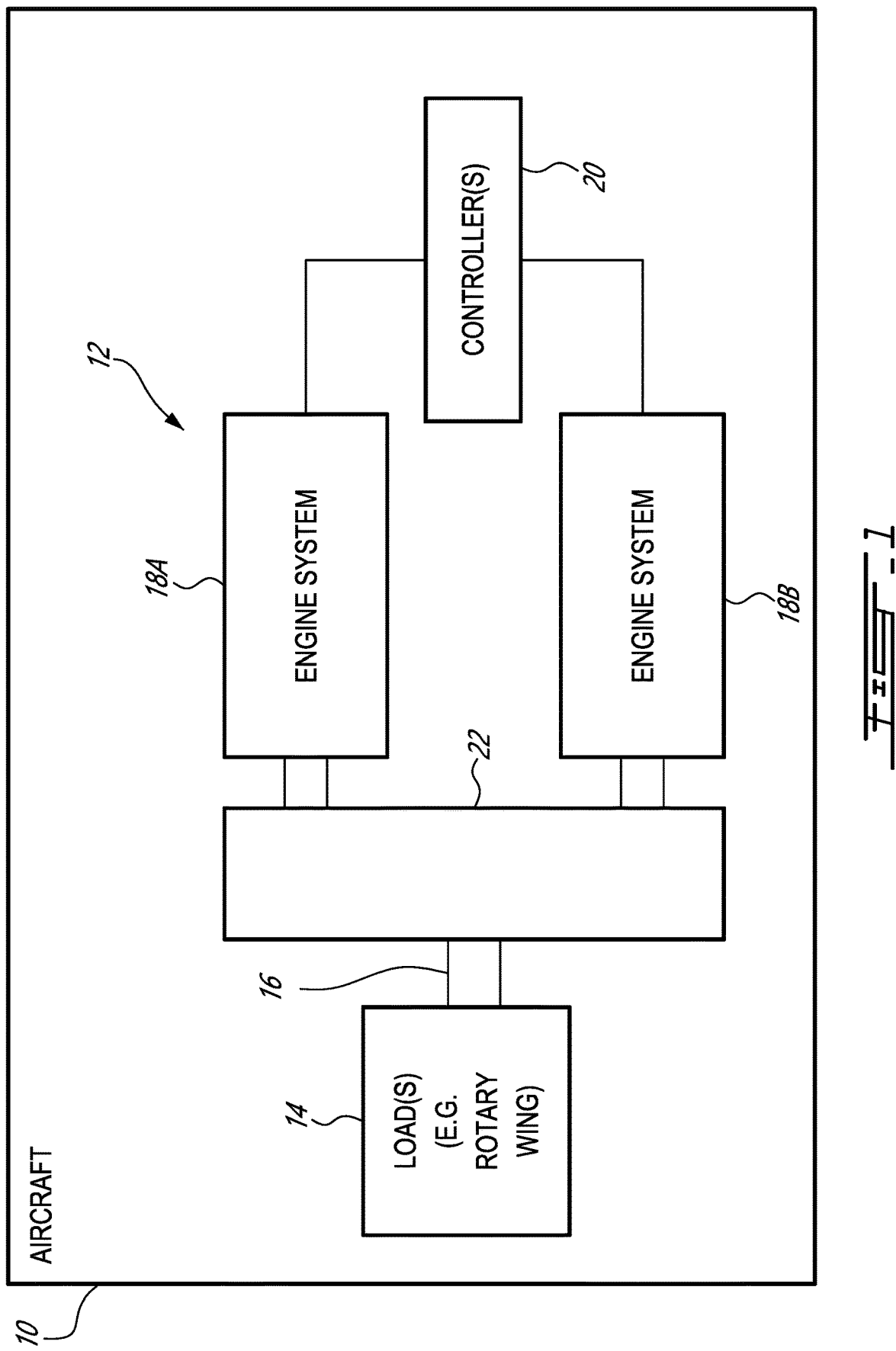
FIG. 1 schematically shows an aircraft including a twin-engine power plant as described herein.

FIG. 1 schematically shows aircraft 10 including aircraft power plant 12 (referred hereinafter as "power plant 12") as described herein. In various embodiments, aircraft 10 may be a manned aircraft or an unmanned aircraft (e.g., drone). For example, aircraft 10 may be a corporate, private, fixed-wing, rotary-wing (e.g., helicopter) or commercial passenger aircraft. In some embodiments, power plant 12 may be part of a propulsion system of aircraft 10. Power plant 12 may be drivingly connected to one or more loads 14 (referred hereinafter in the singular) via output shaft 16. In some embodiments, load 14 may include a propeller configured to generate thrust and/or lift for aircraft 10. In some embodiments, load 14 may include a rotary wing (e.g., main rotor) of a helicopter or other type of rotorcraft. In some embodiments, power plant 12 may provide energy for propelling aircraft 10, and optionally also provide energy to drive loads for functions other than propulsion such as driving a compressor supplying compressed air to pneumatic loads, driving an electric generator supplying electric energy to electric loads, driving an oil pump supplying oil to lubrication loads, and/or driving a hydraulic pump supplying pressurized hydraulic fluid to hydraulic actuators. Alternatively, power plant 12 may be an auxiliary power unit (APU) of aircraft 10 and may provide energy exclusively for functions other than propulsion of aircraft 10.

Aircraft power plant 12 may include a single engine system 18A, or a plurality of engine systems 18A, 18B. For example, power plant 12 may be a multi-engine system (e.g., twin-pack power plant) including first engine system 18A and second engine system 18B. Control of first and second engine systems 18A, 18B may be effected by one or more controller(s) 20, which may be one or more full authority digital engine control(s) ("FADEC(s)"), electronic engine controller(s) (EEC(s)), or the like, that are programmed to manage the operation of engine systems 18A, 18B during various phases of flight of aircraft 10 to reduce an overall fuel burn for example. Controller(s) 20 may include a first controller for controlling first engine system 18A and a second controller for controlling second engine system 18B. In some embodiments, a single controller 20 may be used for controlling first engine system 18A and second engine 18B.

Power plant 12 may be operable so that engine systems 18A, 18B may be operated symmetrically or asymmetrically, with one engine system operating in a high-power "active" mode and the other engine system operating in a lower-power (which could be no power, in some cases) "standby" mode. Doing so may provide fuel saving opportunities to aircraft 10. However there may be other reasons why engine systems 18A, 18B may be operated asymmetrically. Such asymmetric operation of engine systems 18A, 18B may be engaged for a cruise phase of flight (continuous, steady-state flight which is typically at a given commanded constant aircraft cruising speed and altitude) for example. Power plant 12 may be used in aircraft applications but may also be suitable for marine, industrial and/or other ground operations.

In use, first engine system 18A may operate in the active mode while second engine system 18B may operate in the standby mode. During this asymmetric operation, if the helicopter needs a power increase (expected or otherwise), second engine system 18B may be required to provide more power relative to the low power conditions of the standby mode, and possibly return immediately to a high- or full-power condition. This may occur, for example, during take-off or in an emergency condition where the "active" first engine system 18A loses power. Even absent an emergency, it may be desirable to repower the standby engine to exit the asymmetric mode in some situations.

First and second engine systems 18A, 18B may be drivingly connected to load 14 via gearbox 22, which may be of a speed-changing (e.g., reducing) type. For example, gear box 22 may have a plurality of inputs to receive motive power (mechanical energy) from respective shafts of engine systems 18A, 18B. Gear box 22 may be configured to direct at least some of the combined motive power from the plurality of engine systems 18A, 18B toward common output shaft 16 for driving load 14 at a suitable operating (e.g., rotational) speed.

Figure 2:
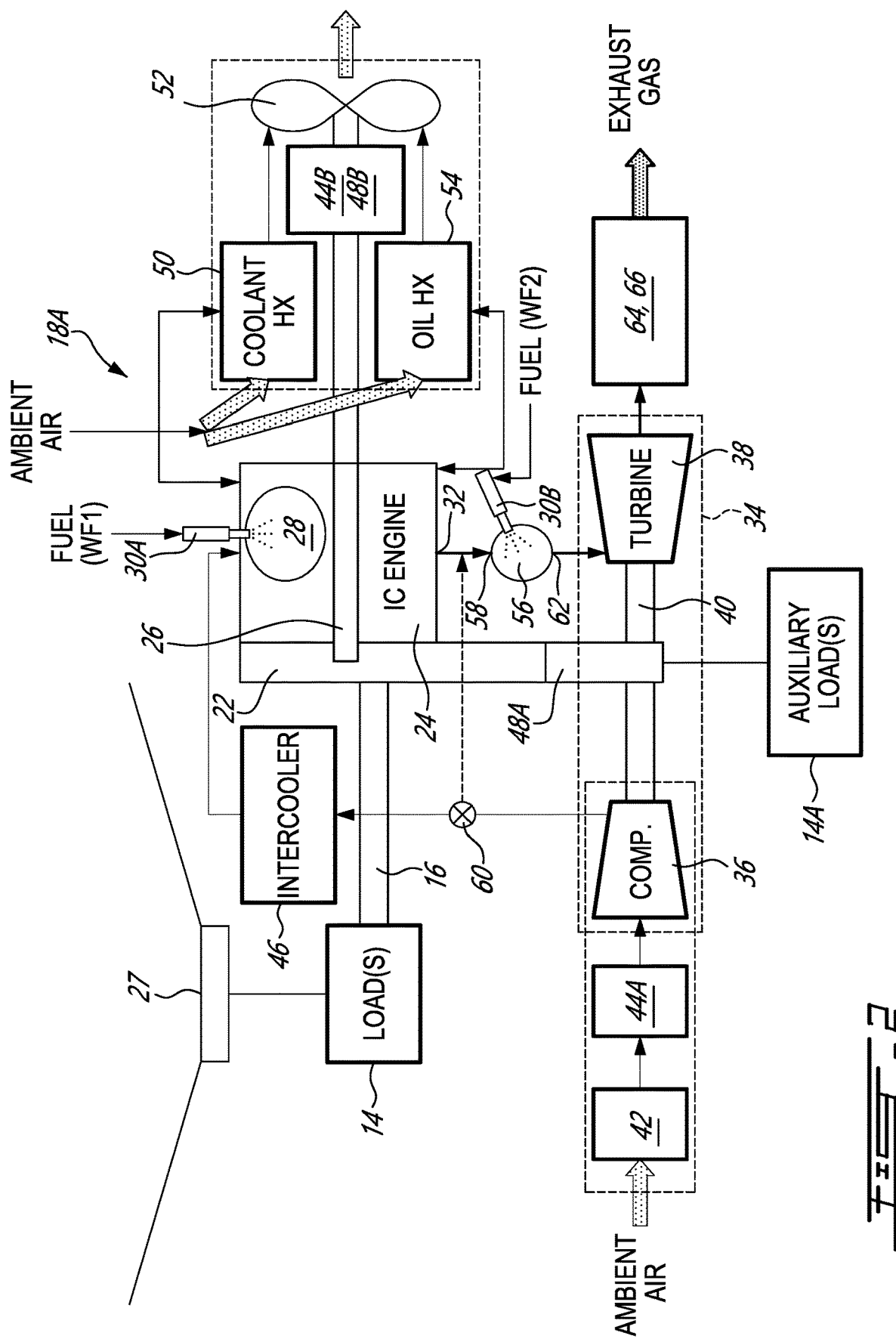
FIG. 2 shows an exemplary schematic representation of an engine system of the aircraft power plant of FIG. 1.

FIG. 2 shows an exemplary schematic representation of first engine system 18A of power plant 12 shown in FIG. 1. In some embodiments, first engine system 18A and second engine system 18B of power plant 12 may be of substantially identical construction, and may have substantially identical power output ratings. Alternatively, in some embodiments, first engine system 18A and second engine system 18B may be of different constructions and may have different power output ratings.

First engine system 18A may include internal combustion (IC) engine 24 using intermittent combustion during operation. IC engine 24 may be of a type other than a gas turbine engine. For example, IC engine 24 may be of a type where the exhaust gas from IC engine 24 produces no significant thrust for propelling aircraft 10. Such IC engine 24 with intermittent combustion may be a reciprocating engine such as piston engine, or a pistonless rotary (e.g., Wankel) engine where heat is added at substantially constant volume in the thermodynamic cycle. In some embodiments, IC engine 24 may include a Wankel engine using an eccentric rotary design to convert pressure into rotating motion. In some embodiments, IC engine 24 may of a type described in U.S. Pat. No. 10,107,195 (Title: COMPOUND CYCLE ENGINE), the entire contents of which are incorporated by reference herein. In some embodiments, IC engine 24 may operate on a mixture of relatively heavy fuel (e.g. diesel, kerosene (jet fuel), equivalent biofuel) and air.

IC engine 24 may drive engine output shaft 26, which may be drivingly connected to load 14 to transfer motive power from IC engine 24 to load 14. Load 14 may include main rotor 27 of a helicopter. IC engine 24 may include combustion chamber 28 including one or more fuel injectors 30A (referred hereinafter in the singular) for delivering fuel WF1 into combustion chamber 28. Fuel WF1 may be mixed with air in combustion chamber 28 and ignited to generate a flow of first exhaust gas. The flow of first exhaust gas may be discharged from exhaust outlet 32 of IC engine 24. Exhaust outlet 32 may be an outlet of combustion chamber 28.

In some embodiments, IC engine 24 may be turbocharged by way of optional turbocharger 34. Turbocharger 34 may include compressor 36 and turbine 38 which may be drivingly interconnected via turbine shaft 40 so that compressor 36 may be driven by turbine 38. Compressor 36 and turbine 38 may each be a single-stage device or a multiple-stage device with a single shaft, or split on multiple independent shafts in parallel or in series, and may be a centrifugal, axial or mixed device. Compressor 36 of turbocharger 34 may receive (e.g., ambient) air and compress the air to be supplied as combustion air to IC engine 24. The ambient air may be received via ambient air inlet 42 and optional variable-orientation guide vanes 44A that may guide the flow of ambient air being delivered to compressor 36 to promote a desirable operation of compressor 36 at different operating conditions. In some embodiments, the compressed air from compressor 36 may be passed through intercooler 46. Intercooler 46 may include a suitable (e.g., air to air) heat exchanger that may facilitate heat transfer from the compressed air to ambient air or to another fluid to remove some of the heat added to the compressed air during compression, and promote a desirable operation of IC engine 24.

Turbine shaft 40 of turbocharger 34 may be drivingly connected to load 14 via output shaft 16, gearbox 22, and optional variable speed transmission 48A so that motive power extracted by turbine 38 may be transferred to load 14. Variable speed transmission 48A, may permit motive power to be transmitted from turbine shaft 40 to load 14 at varying relative rotational speeds between turbine shaft 40 and load 14. In some embodiments, variable speed transmission 48A may be a continuously variable transmission (CVT) that can change seamlessly and continuously through a range of gear ratios. Turbine shaft 40 of turbocharger 34 may optionally be drivingly connected to one or more auxiliary loads 14A, directly, via a clutch, via a gearbox, and/or via another or the same variable speed transmission 48A, so that motive power may be transferred from turbine 38 to auxiliary load(s) 14A. Such auxiliary load(s) 14A may include an electric generator, an oil pump of a lubrication system, and/or a hydraulic pump of a hydraulic system for example.

In some embodiments, IC engine 24 may be liquid cooled using suitable coolant fluid (e.g., a solution of a suitable organic chemical such as ethylene glycol, diethylene glycol, or propylene glycol in water). For example, heat generated by IC engine 24 may be transferred to a suitable coolant fluid (e.g., liquid) circulating into IC engine 24, and carried out of IC engine 24 by the coolant fluid. Heat may then be rejected by the coolant fluid via coolant heat exchanger 50 (referred hereinafter as "coolant HX 50"), which may promote heat transfer from the coolant fluid to ambient air. The ambient air may be driven through coolant HX 50 by fan 52. Fan 52 may be configured and positioned to pull or push the ambient air through coolant HX 50. In some embodiments, fan 52 may be mechanically driven by engine output shaft 26 either directly or via variable speed transmission 48B which may be a CVT for example. However, fan 52 could instead be driven by other means such as an electric motor or a hydraulic motor for example. In some embodiments, variable-orientation guide vanes 44B may guide the flow of ambient air being delivered to fan 52 to promote a desirable operation of fan 52 at different operating conditions.

Some heat generated by IC engine 24 may also be transferred to a suitable lubricating fluid (e.g., oil) circulating into IC engine 24, and carried out of IC engine 24 by the lubricating fluid. Heat may then be rejected by the lubricating fluid via oil heat exchanger 54 (referred hereinafter as "oil HX 54"), which may promote heat transfer from the lubricating fluid to ambient air. The ambient air may be driven through oil HX 54 by fan 52 or another fan. Fan 52 may be configured and positioned to pull or push the ambient air through oil HX 54.

First engine system 18A may include combustor 56 operatively disposed between IC engine 24 and turbine 38 of turbocharger 34. Combustor 56 may be operated as an inter-burner as needed when supplemental power output capacity from first engine system 18A is required. When the supplemental power output capacity from first engine system 18A is not required, combustor 56 may be inactive and the first exhaust gas discharged from exhaust outlet 32 of IC engine 24 may be directed to turbine 38 and may drive turbine 38. In other words, turbine 38 may extract motive power from the first exhaust gas discharged from exhaust outlet 32. During this mode of operation, the first exhaust gas discharged from exhaust outlet 32 may pass through combustor 56 while combustor 56 is inactive (i.e., unlit). In some embodiments, IC engine 24 may provide a pulsating exhaust gas flow out of exhaust outlet 32.

Combustor 56 may include combustor inlet 58 in fluid communication with exhaust outlet 32 of IC engine 24 to receive the flow of first exhaust gas from IC engine 24 into combustor 56. Combustor 56 may be disposed outside and downstream of combustion chamber 28 of IC engine 24. Combustor 56 may be disposed outside of IC engine 24. In some operating conditions, the air-fuel mixture that is burned in combustion chamber 28 of IC engine 24 may have an air-fuel ratio that is higher than stoichiometric (i.e., lean), and the resulting first exhaust gas discharged from exhaust outlet 32 may contain sufficient oxygen to sustain subsequent combustion in combustor 56 in order to generate the supplemental power output capacity of first engine system 18A. In some embodiments, first engine system 18A may include one or more valves 60 that are operatively disposed to permit compressed air produced by compressor 36 to be selectively injected into the first exhaust gas discharged from exhaust outlet 32. Valve(s) 60 may include a three-way valve configured to permit a portion of the compressed air from compressor 36 to be delivered to intercooler 46, and another portion of the compressed air from compressor 36 to be injected into the first exhaust gas downstream of exhaust outlet 32. In some situations, the additional air may be added to the first exhaust gas if required to facilitate subsequent combustion in combustor 56, or to help/facilitate the (e.g., surge free) operability of compressor 36 under certain operating conditions.

Combustor 56 may include one or more fuel injectors 30B for injecting fuel into combustor 56 where the fuel is mixed with the first exhaust gas discharged from exhaust outlet 32, and ignited for generating a flow of second exhaust gas containing a greater amount of energy. The number and configuration of fuel injector(s) 30B may be selected to provide adequate priming and fuel delivery to combustor 56 in order to provide an acceptable activation/response time in case of an emergency situation for example. In some embodiments, the temperature of first exhaust gas entering combustor 56 may be sufficiently high so that ignition of the fuel injected into combustor 56 via injector(s) 30B may be automatic. In some embodiments, combustor 56 may include one or more igniters to facilitate the ignition of combustor 56.

Combustor 56 may include combustor outlet 62 for discharging the flow of second exhaust gas from combustor 56. Turbine 38 may be in fluid communication with combustor outlet 62 and be driven by the flow of second exhaust gas. In other words, turbine 38 may convert energy from the flow of second exhaust gas into motive power that can be used to drive compressor 36, load 14 and/or auxiliary load(s) 14A. The flow of second exhaust gas flowing through turbine 38 may then be discharged from first engine system 18A via exhaust duct 64 and muffler 66.

Figure 3:
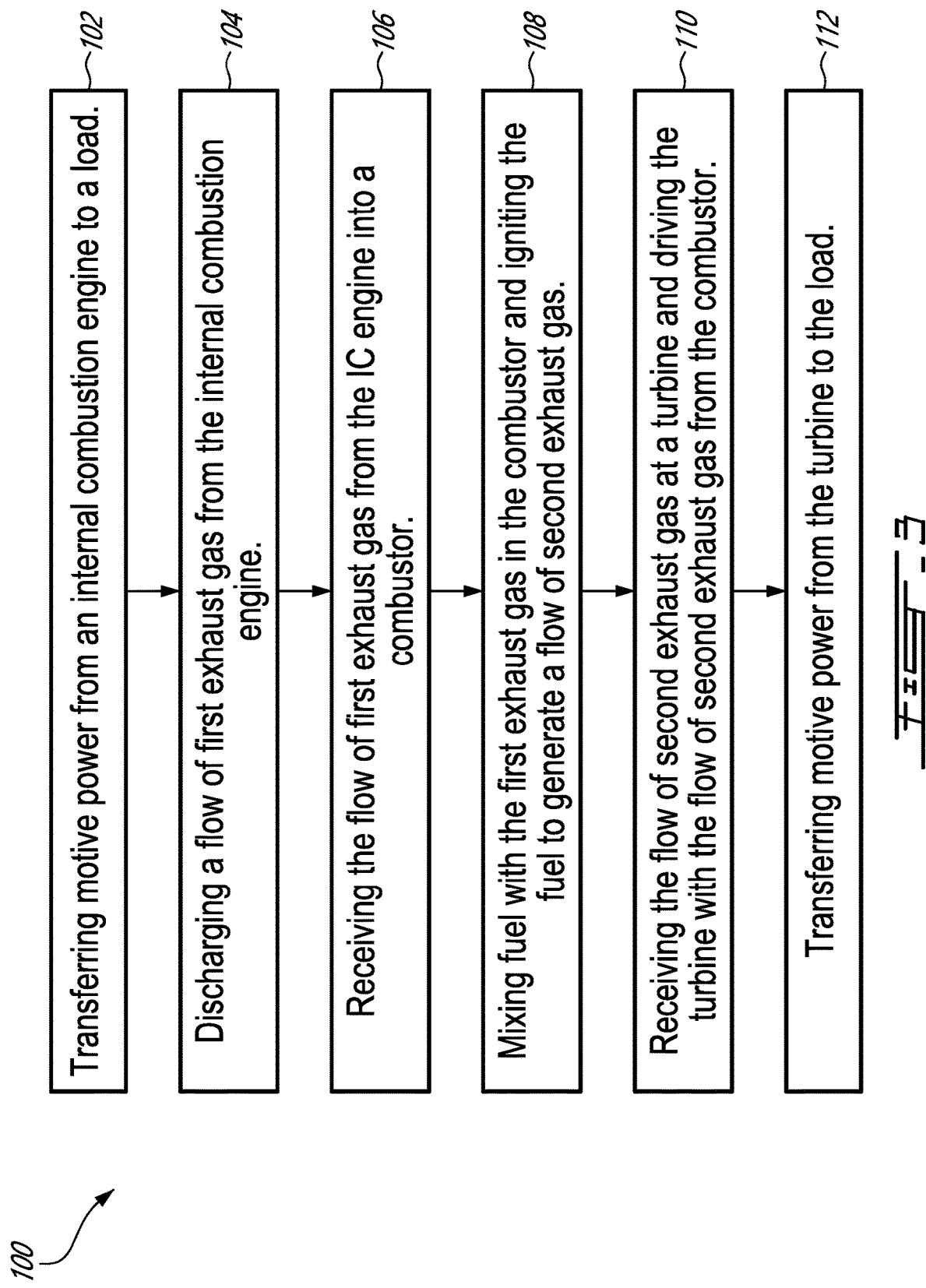
FIG. 3 is a flowchart of an exemplary method of driving a load onboard an aircraft.

FIG. 3 is a flowchart of an exemplary method 100 of driving a load (e.g., load 14 and/or auxiliary load 14A) onboard aircraft 10. Method 100 may be performed using first engine system 18A and/or using second engine system 18B described herein or using other engine system(s). Aspects of power plant 12 and of first engine system 18A may be incorporated into method 100. Aspects of method 100 may be combined with other steps or actions disclosed herein. In various embodiments, method 100 may include:

- transferring motive power from IC engine 24 to load 14 (block 102);
- discharging a flow of first exhaust gas from IC engine 24 when transferring motive power from IC engine 24 to load 14 (block 104);
- receiving the flow of first exhaust gas from IC engine 24 into combustor 56 (block 106);
- mixing fuel WF2 with the first exhaust gas in combustor 56 and igniting the fuel WF2 to generate a flow of second exhaust gas (block 108);
- receiving the flow of second exhaust gas at turbine 38 and driving turbine 38 with the flow of second exhaust gas from combustor 56 (block 110); and
- transferring motive power from the turbine to the load (block 112).

Method 100 may include transferring motive power from turbine 38 to compressor 36 of turbocharger 34 to drive compressor 36. Compressor 36 may compress ambient air and the compressed air may be delivered to IC engine 24 and used as compressed air by IC engine 24.

In some embodiments of method 100, load 14 may include main rotor 27 of a helicopter.

In some embodiments of method 100, combustor 56 may be used during momentary peak power operation only when the supplemental power output capacity beyond that of IC engine 24 is required from first engine system 18A or from second engine system 18B. Such momentary peak power operation may be performed during a takeoff phase of flight of aircraft 10, and/or during an emergency situation for example. Accordingly, method 100 may, after the momentary peak power operation, include:

- ceasing to mix fuel WF2 with the first exhaust gas and igniting the fuel WF2 in combustor 56 to generate a flow of second exhaust gas;
- receiving the flow of first exhaust gas at turbine 38 and driving turbine 38 with the flow of first exhaust gas; and
- transferring motive power from turbine 38 to load 14 and/or to compressor 36 of turbocharger 34 associated with IC engine 24.

When ceasing to mix fuel WF2 with the first exhaust gas inside of combustor 56, fuel flow to combustor 56 via fuel injector(s) 30B may be stopped. The flow of first exhaust gas may flow through combustor 56 while combustor 56 is inactive. In order to prevent coking of residual fuel WF2 inside of fuel injector(s) 30B, a suitable forward or reverse fuel purging procedure may be implemented in order to clear fuel injector(s) 30B of residual fuel WF2. For example, compressed air may be directed into fuel injector(s) 30B in order to push the residual fuel WF2 into combustor 56 after the delivery of fuel WF2 to fuel injector(s) 30B has been stopped. Alternatively, a reverse purging procedure may be implemented to withdraw residual fuel WF2 from fuel injector(s) 30B and collect the residual fuel WF2 into a suitable reservoir.

Figure 4:
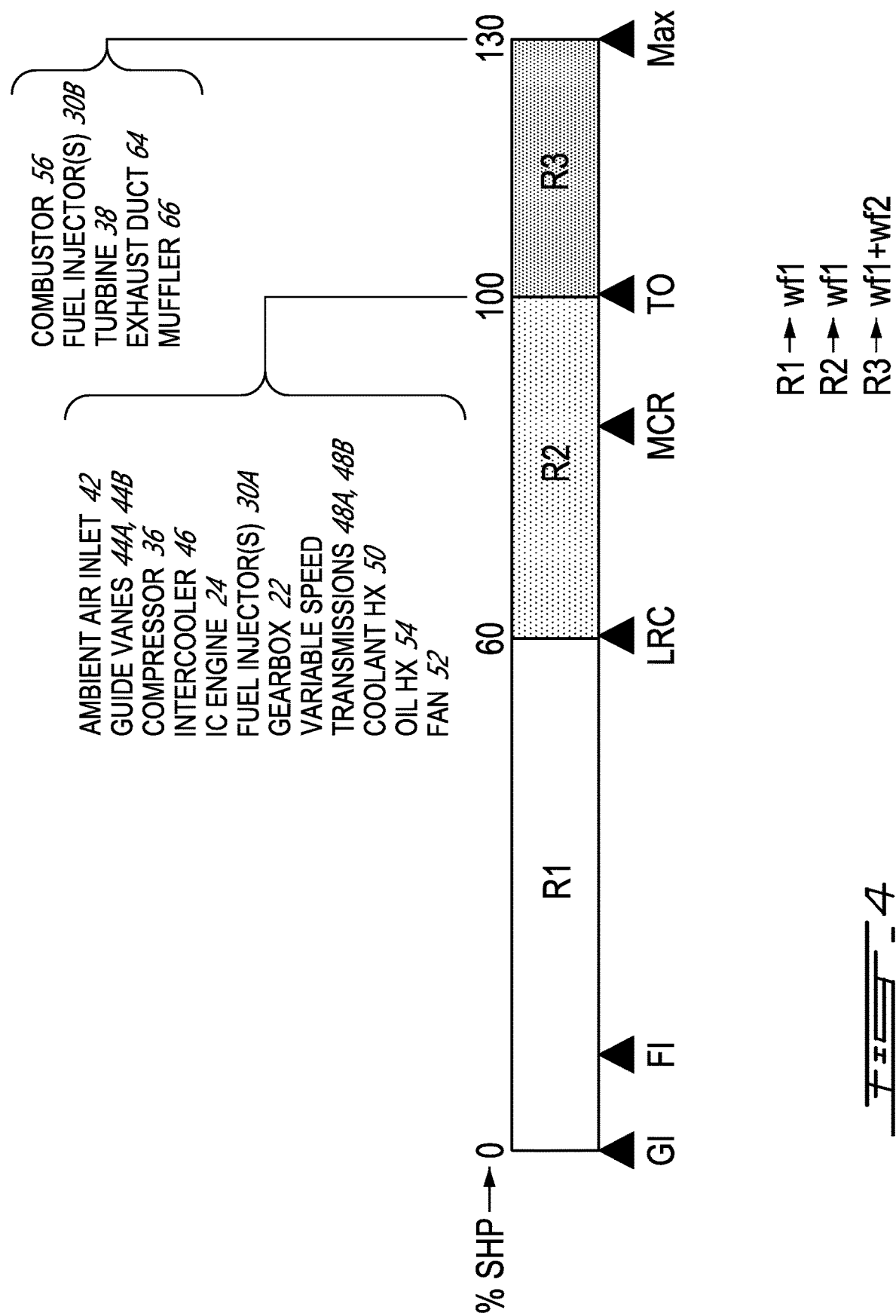
FIG. 4 is a graphical representation of different operating regimes of the engine system of FIG. 2 together with exemplary sizing requirements for elements of the engine system.

FIG. 4 is a graphical representation of different operating regimes of first engine system 18A together with exemplary sizing requirements for elements of first engine system 18A. First engine system 18A may be arranged in a turboshaft setup in a twin-engine helicopter. First engine system 18A may be designed for a 130% maximum shaft horsepower (SHP) capability where 0% SHP corresponds to a ground idle (GI) power rating, 60% SHP corresponds to a long range cruise (LRC) power rating, and 100% SHP corresponds to the required takeoff (TO) power rating. FIG. 4 also shows a location of a flight idle (FI) power rating disposed between GI and LRC. FIG. 4 also shows a location of a maximum cruise (MCR) power rating disposed between LRC and TO.

FIG. 4 shows three operating regimes of first engine system 18A disposed along a power output scale expressed in % SHP extending from 0% to 130%. First regime R1 may correspond to a relatively low power/transient operation where the operability (e.g., no compressor surge) may be a key objective and specific fuel consumption (SFC) may be less important. During first regime R1, the SHP delivered to load 14 may be provided by IC engine 24 with fuel WF1 being delivered to combustion chamber 28, and with combustor 56 being inactive where fuel WF2 is not being delivered to combustor 56.

Second regime R2 may correspond to normal day-to-day operation where all engines of aircraft 10 are operative. Obtaining a favorable SFC may be a key objective in second regime R2. During second regime R2, the SHP delivered to load 14 may be provided by IC engine 24 with fuel WF1 being delivered to combustion chamber 28, and with combustor 56 being inactive where fuel WF2 is not being delivered to combustor 56.

Third regime R3 may correspond to an emergency condition such as when second engine system 18B is inoperative (i.e., "one engine inoperative" or "OEI") for example, and first engine system 18A must provide supplemental power output. During third regime R3, obtaining the required SHP output from first engine system 18A may be a key objective and SFC may be less important. During third regime R3, the SHP delivered to load 14 may be provided by IC engine 24 with fuel WF1 being delivered to combustion chamber 28, and also with combustor 56 being active where fuel WF2 is being delivered to combustor 56 as well. The supplemental power output required from first engine system 18A may be beyond what IC engine 24 alone is capable of providing. Accordingly, the supplemental power output may be provided by way of combustor 56.

FIG. 4 also indicates sizing requirements for various components of first engine system 18A. As explained above the architecture of first engine system 18A may make the supplemental power output capacity available without incurring significant size or weight penalty for first engine system 18A. A maximum power output capacity of first aircraft engine system 18A may be greater than a maximum output power capacity of IC engine 24. For example, the supplemental power capacity may be provided separately from IC engine 24 so that the power output capacity of IC engine 24 may be left intact. Consequently, the bearing loads of IC engine 24, and the size and weight of the (e.g., liquid-cooling, oil cooling) systems of IC engine 24 also may not need to be increased. In other words, IC engine 24 and its associated systems may be designed and sized to function effectively and efficiently in first regime R1 and second regime R2 between 0% SHP and 100% SHP. First engine system 18A may nevertheless provide the supplemental power output capacity using combustor 56 when required. Accordingly, as shown in FIG. 4, several components of engine system 18A may only need to be sized for 100% SHP (i.e., TO rating) while only some components of engine system 18A may required to be sized for 130% SHP.

The upsizing of muffler 66 may be optional since muffler 66 could potentially be bypassed during the momentary operation in third regime R3. Variable speed transmission 48A and gearbox 22 may be designed for 100% SHP but may also have the capacity to momentarily operate at 130% SHP with some design adjustments (if required).

FIG. 5 is another graphical representation of different operating regimes of first engine system 18A together with exemplary sizing requirements for elements of first engine system 18A. First engine system 18A may be arranged in a turboshaft setup in a twin-engine helicopter. First engine system 18A may be designed for a 115% maximum SHP capability where 0% SHP corresponds to a GI power rating, 60% SHP corresponds to a LRC power rating, and 100% SHP corresponds to the required TO power rating. FIG. 5 also shows a location of a FI power rating between GI and LRC. FIG. 5 also shows a location of a MCR power rating at 85% SHP.

FIG. 5 shows three operating regimes of first engine system 18A disposed along a power range scale expressed in % SHP extending from 0% to 115%. First regime R1 may correspond to a relatively low power/transient operation where the operability (e.g., no compressor surge) may be a key objective and specific fuel consumption (SFC) may be less important. During first regime R1, the SHP delivered to load 14 may be provided by IC engine 24 with fuel WF1 being delivered to combustion chamber 28, and with combustor 56 being inactive where fuel WF2 is not being delivered to combustor 56.

Second regime R2 may correspond to normal day-to-day operation (other than TO) where all engines of aircraft 10 are operative and obtaining a favorable SFC may be a key objective. During second regime R2, the SHP delivered to load 14 may be provided by IC engine 24 with fuel WF1 being delivered to combustion chamber 28, and with combustor 56 being inactive where fuel WF2 is not being delivered to combustor 56.

Third regime R3 may include the TO rating (100% SHP) and also an emergency condition beyond the TO rating such as when second engine system 18B is inoperative (i.e., "one engine inoperative" or "OEI") for example, and first engine system 18A must provide supplemental power output. During third regime R3, obtaining the required SHP output from first engine system 18A may be a key objective and SFC may be less important. During third regime R3, the SHP delivered to load 14 may be provided by IC engine 24 with fuel WF1 being delivered to combustion chamber 28, and with combustor 56 being active where fuel WF2 is being delivered to combustor 56. The supplemental power output required from first engine system 18A between 85%-115% SHP may be beyond what IC engine 24 alone is normally capable of providing. Accordingly, the supplemental power output may be provided by way of combustor 56.

Compared to FIG. 4, the engine configuration represented in FIG. 5 may provide a lower maximum SHP but may offer better SFC when operating at LRC (~60% SHP) with a smaller compressor 36 and smaller fuel injector(s) 30A, both designed for MCR rating of 85% SHP. In other words, the engine configuration represented in FIG. 4 may be designed for a higher maximum SHP (i.e., +30% over the TO rating), with relatively good LRC SFC. On the other hand, the engine configuration represented in FIG. 5 may be designed for better LRC SFC, with lower maximum SHP (i.e., +15% over the TO rating).

FIG. 5 also indicates sizing requirements for various components of first engine system 18A. As explained above the architecture of first engine system 18A may make the supplemental power output capacity available without incurring significant size or weight penalty for first engine system 18A. For example, the supplemental power capacity may be provided separately from IC engine 24 so that the power output capacity of IC engine 24 need not be increased. Consequently, IC engine 24 and its associated systems may be designed and sized to function effectively and efficiently in first regime R1 and second regime R2 between 0% SHP and 85% SHP. First engine system 18A may nevertheless provide the supplemental power output capacity using combustor 56 when required. Accordingly, as shown in FIG. 5, some components may only need to be sized for 85% SHP (i.e., MCR rating), some components may need to be sized for 100% SHP (i.e., TO rating), and some components may require to be sized for 115% SHP.

The upsizing of muffler 66 may be optional since muffler 66 could potentially be bypassed during the momentary operation beyond 100% SHP. Variable speed transmission 48A and gearbox 22 may be designed mainly for 100% SHP but may also have the capacity to momentarily operate at 115% SHP with some design adjustments (if required). Similarly, components and systems associated with IC engine 24 may be designed mainly for 85% SHP but may also have the capacity to momentarily operate at 100% SHP to handle the TO phase with some design adjustments (if required). In reference to FIG. 5, combustor 56 may be used between 85 and 115% SHP. Fuel Injector(s) 30A for injecting WF1 into IC engine 24 may be sized/optimized to cause IC engine 24 to deliver 85% SHP. The extra output power beyond 85% SHP may then come solely from the use of fuel injector(s) 30B and combustor 56. Some components such as IC engine 24, gearbox 22, variable speed transmission 48A, and optionally exhaust duct 64, and muffler 66 may still need to be sized for 100% SHP to provide an adequate durability to permit IC engine 24 to be operated continuously at 85% SHP (MCR) for example.

The embodiments described in this document provide non-limiting examples of possible implementations of the present technology. Upon review of the present disclosure, a person of ordinary skill in the art will recognize that changes may be made to the embodiments described herein without departing from the scope of the present technology. Modifications could be implemented by a person of ordinary skill in the art in view of the present disclosure, which modifications would be within the scope of the present technology.

What is claimed is:

1. An aircraft power plant comprising:
   an internal combustion (IC) engine using intermittent combustion during operation, the IC engine being drivingly connected to a load via a gearbox to transfer motive power from the IC engine to the load, the IC engine having an exhaust outlet for discharging a flow of first exhaust gas;
   a combustor including:
   a combustor inlet in fluid communication with the exhaust outlet of the IC engine to receive the flow of first exhaust gas from the IC engine into the combustor;
   a fuel injector for injecting fuel into the combustor in which the fuel is mixed with the first exhaust gas and ignited to generate a flow of second exhaust gas; and
   a combustor outlet for discharging the flow of second exhaust gas;
   a turbocharger associated with the IC engine, the turbocharger including:

a turbine in fluid communication with the combustor outlet and driven by the flow of second exhaust gas, the turbine being drivingly connected to the load to transfer motive power from the turbine to the load; and a compressor drivingly connected to the turbine and driven by the turbine to compress combustion air for the IC engine; and a continuously variable transmission, the turbine being drivingly connected to the load via the continuously variable transmission and the gearbox.

2. The aircraft power plant as defined in claim 1, comprising a shaft drivingly connecting the turbine and the compressor, the turbine being drivingly connected to the load via the shaft.

3. The aircraft power plant as defined in claim 1, wherein:
the IC engine includes a combustion chamber; and
the exhaust outlet of the IC engine is configured to discharge the flow of first exhaust gas from the combustion chamber of the IC engine.

4. The aircraft power plant as defined in claim 1, wherein the IC engine is a Wankel engine.

5. The aircraft power plant as defined in claim 1, comprising a liquid cooling system for cooling the IC engine, the liquid cooling system including:
a heat exchanger to promote heat transfer from a coolant fluid carrying heat from the IC engine to ambient air; and a fan mechanically driven by the IC engine via a variable speed transmission to drive the ambient air through the heat exchanger.

6. The aircraft power plant as defined in claim 1, wherein:
the IC engine is a first IC engine; and
the aircraft power plant includes a second IC engine drivingly connected to the load.

7. A helicopter comprising the aircraft power plant as defined in claim 6, wherein the load includes a main rotor of the helicopter.

8. An aircraft comprising the aircraft power plant as defined in claim 1.

9. The aircraft power plant as defined in claim 1, comprising variable-orientation guide vanes configured to guide a flow of ambient air being delivered to the compressor.

10. The aircraft power plant as defined in claim 1, comprising a muffler in fluid communication with the turbine to permit the flow of second exhaust gas flowing through the turbine to be discharged via the muffler.

11. The aircraft power plant as defined in claim 1, comprising an intercooler disposed between the compressor and the IC engine to remove heat added to the combustion air by the compressor.

12. The aircraft power plant as defined in claim 5, comprising variable-orientation guide vanes guiding a flow of ambient air being delivered to the fan.

* * * * *